F. B. NORTON.
GRINDING AND POLISHING SURFACES AND WHEELS.
No. 187,167. Patented Feb. 6, 1877.
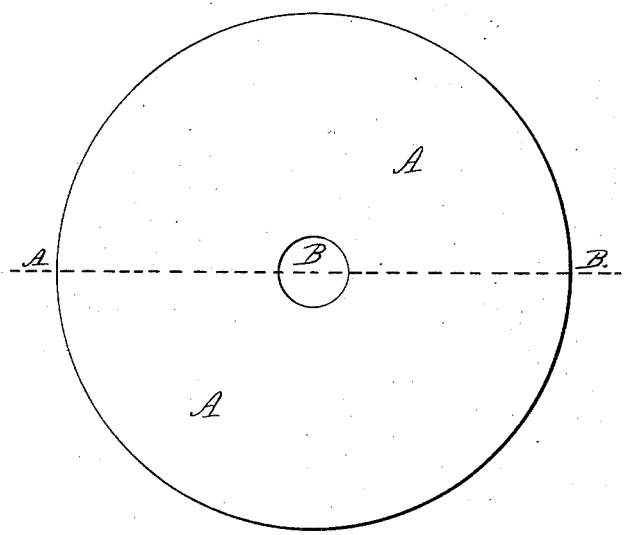
WITNESSES:
INVENTOR:
Franklin B. Norton

UNITED STATES PATENT OFFICE.

FRANKLIN B. NORTON, OF WORCESTER, MASSACHUSETTS.

IMPROVEMENT IN GRINDING AND POLISHING SURFACES AND WHEELS.

Specification forming part of Letters Patent No. 187,167, dated February 6, 1877; application filed November 20, 1876.

*To all whom it may concern:*

Be it known that I, FRANKLIN B. NORTON, of the city and county of Worcester, and Commonwealth of Massachusetts, have invented certain new and useful Improvements in Grinding, Cutting, or Polishing Surfaces and Wheels; and I do hereby declare that the following is a full, clear, and exact description of the same, reference being had to the accompanying drawings, forming a part of this specification, and in which—

Figure 1 represents a side view of one of my said improved wheels, and Fig. 2 represents a section taken on line A B, Fig. 1.

To enable those skilled in the art to which my invention belongs to make and use the same, I will proceed to describe it more in detail.

In the drawings, A represents a wheel, having a hole, B, through its center to receive the shaft, by means of which the wheel is revolved.

The nature of my invention consists in the combination of corundum or emery, feldspar, and vitreous clay to form grinding, cutting, or polishing surfaces and wheels, as will be hereafter more fully explained.

In the manufacture of my said grinding, cutting, or polishing surfaces or wheels from the substances or materials above named, the following mode or process of operation is pursued: Of vitreous clay, powdered, two pounds; of feldspar, powdered, one pound. These substances, in the proportions named, are well mixed together, in a dry state, in any suitable receptacle or vessel. This mixture of vitreous clay and feldspar is then mixed with corundum, in a dry state, in the proportions of one-fourth (¼) of a pound of the former to one pound (1) of the latter—that is to say, with every pound of emery or corundum one-fourth of a pound of the mixture of vitreous clay and feldspar, above named, is mixed in a dry state, and the whole well stirred together in any suitable vessel. Sufficient water is then added to the mixture, to produce, when well stirred in, a plastic or mortar-like compound, suitable for molding. The plastic material is then put into suitable molds, and formed into wheels or other shaped surfaces. The molded articles are then put into a kiln and subjected to a gradually-increasing heat until a vitrification of the clay and feldspar takes place, and which I have found to take, ordinarily, about forty-two (42) hours.

Wheels and grinding, cutting, or polishing surfaces thus formed, I have found from actual tests, are sufficient for successfully cutting and polishing chilled iron, hardened steel, and other hard metals and stones. Then, again, such wheels or other shaped articles do not heat or glaze up by use, while they can be used wet or dry, under water or out of it, with equal success, and long usage does not have but little effect in reducing the size of the wheels.

Having described my improved grinding, cutting, or polishing wheels and other surfaces, what I claim as my invention, and desire to secure by Letters Patent, is—

1. A wheel or other shaped grinding, cutting, or polishing article, made from vitreous clay, feldspar, and corundum or emery, combined together substantially in the proportions and manner herein described.

2. The combination, in a grinding, cutting, or polishing wheel of vitreous clay and feldspar, with corundum or emery, substantially as and for the purposes set forth.

FRANKLIN B. NORTON.

Witnesses:
THOS. H. DODGE,
E. E. MOORE.